3,374,192
MODIFIED CEMENT MORTAR CONTAINING EMULSION POLYMER OF 2 METHYL α OLEFIN AND MIXED DIALKYL FUMARATE

Roman S. Slysh, Scotch Plains, and George M. Kagan, Metuchen, N.J., assignors to Esso Research and Engineering Company, a corporation of Delaware
No Drawing. Continuation-in-part of application Ser. No. 379,731, July 1, 1964. This application Nov. 18, 1965, Ser. No. 508,545
6 Claims. (Cl. 260—17)

This application is a continuation-in-part of S. N. 379,731 filed July 1, 1964, now Patent 3,314,908.

The present invention relates to cementitious mortars. In general, it concerns a cementitious mortar for bonding bituminous-containing structural elements. In particular, it is directed to a cementitious mortar comprising cement, sand, water and an emulsion polymer of a 2-methyl alpha olefin and mixed dialkyl fumarate.

A large number of mortars are well known to the art, most of which are designed for bonding particular materials together. There are many old and well-known mortars for bonding fired clay brick, some of which are also effective bonding agents for cement blocks, cinder blocks and clay blocks. However, in order to obtain the greatest bonding strength, compressive strength and wet strength, it is necessary to formulate particular mortars to do particular jobs. One of the problems facing the art has been the development of a mortar which would effectively bond structural elements consisting in part of a bituminous binder material. The problem is complicated by the fact that the materials which will effectively bond bituminous materials together are very expensive compared to a conventional mortar for bonding fired clay brick or cement blocks. Therefore, in order for those building elements utilizing a bituminous material as a binder to be competitive with conventional widely used building elements, there, of necessity, must be a low-cost, high-strength material for use as a bonding agent between the bituminous-containing structural elements.

It has now been found that a highly efficient cementitious mortar may be made in accordance with this invention. The mortars hereinafter described are competitive price-wise with materials presently on the market when compared on a unit-structure basis. The mortar of this invention consists of a conventional mortar of sand, cement and water to which has been added an emulsion of a polymer of a 2 - methyl alpha olefin and a mixed dialkyl fumarate.

The alpha olefin monomer employed in the emulsion polymers consists of at least one aliphatic 2 - methyl alpha monoolefin having from 4 to 9 carbon atoms, and more preferably from 4 to 6 carbon atoms. Representative nonlimiting examples of useful $C_4$ to $C_9$ aliphatic 2 - methyl alpha monoolefins are: isobutylene or 2 - methyl - 1 - propene; 2 - methyl - 1 - pentene; 2 - methyl - 1 - hexene; 2 - methyl - 1 - heptene; and 2 - methyl - 1 - octene. The preferred aliphatic 2 - methyl alpha monoolefin is isobutylene, because it is commercially available in large quantities at very low cost.

The fumaric ester component of the present emulsion polymers must contain the proper alkyl functionality in order to be suitable for use in the mortar. For example, polymers formed from fumaric esters having only $C_1$ to $C_3$ alkyl fuctionality are found to be extremely hard and brittle. Similarly, polymers formed from fumaric esters having only the $C_4$ to $C_{18}$ alkyl functionality tend to be too soft and tacky.

The proper alkyl functionality is introduced into the polymer by utilizing a dialkyl fumarate ester system consisting of either a mixed dialkyl fumarate ester having the general formula:

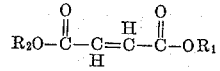

wherein $R_1$ is a $C_1$ to $C_3$, preferably $C_2$, alkyl radical and $R_2$ is a $C_4$ to $C_{18}$, preferably $C_4$ to $C_8$, alkyl radical; or a mixture of dialkyl fumarate esters wherein 1 to 99 mole percent of the mixture is a dialkyl $C_1$ to $C_3$, preferably $C_2$, fumarate ester, e.g. diethyl fumarate, and 99 to 1 mole percent of the mixture is a dialkyl $C_4$ to $C_{18}$, preferably $C_4$ to $C_{18}$, fumarate ester, e.g. dioctyl fumarate.

Representative examples of useful mixed dialkyl fumarate esters include: methyl amyl fumarate; methyl heptyl fumarate; ethyl butyl fumarate; ethyl hexyl fumarate; propyl 1 - methylbutyl fumarate; 1 - methylethyl nonyl fumarate; methyl decyl fumarate; ethyl dodecyl fumarate; and 1 - methylethyl cetyl fumarate. The mixed esters useful in the present invention can be obtained by reacting fumaric acid with a mixture of alcohols in a desired proportion. Long chain alcohols having from 10 to 18 carbon atoms can be obtained by the hydrogenation of coconut oil or beef tallow.

Mixtures of difumarate esters that are suitable monomers for the formation of the polymers employed in the present invention include: dimethyl fumarate and dibutyl fumarate; diethyl fumarate and dibutyl fumarate; dipropyl fumarate and dihexyl fumarate; diisopropyl fumarate and diheptyl fumarate; diethyl fumarate and di (methylbutyl) fumarate; dimethyl fumarate and dioctyl fumarate; dipropyl fumarate and didodecyl fumarate; and diisopropyl fumarate and ditetradecyl fumarate.

Small amounts of alpha beta unsaturated mono or dicarboxylic acids can be interpolymerized with the 2-methyl alpha olefin and mixed dialkyl fumarate ester system. Incorporation of minor amounts, e.g. 1 to 5 wt. percent of the dicarboxylic acid into the polymer serves to stabilize the polymer in emulsion. Examples of useful acids are fumaric acid, acrylic acid, methacrylic acid, maleic acid, itaconic acid, etc.

The preparation of the emulsion polymers is described in the above identified copending application. The emulsion polymers generally have a solids content in the range of about 30 to 60% and a pH of about 7.1 to 10. The emulsion polymers and their method of preparation per se form no part of the present invention.

In addition to the above described emulsion polymer the mortar of the present invention will contain sand or other aggregate, cement, e.g. Portland and water. The mortar can also contain one or more other components such as fillers, e.g. talc, fly ash, line, limestone, blast furnace slag, gypsum, etc.; antifoam agents, e.g. dimethylpolysiloxane emulsion etc. Various waterproofing agents, such as stearates or silicones, may also be included. A preferred mortar contains methyl cellulose as an additional component. Mixtures of sand, cement, and water are referred to herein as "conventional cementitious mortars."

The compositions of such conventional cementitious mortars are well known in the art and per se form no part of the present invention.

The amount of the emulsion polymer employed in combination with conventional cementitious mortar to give the mortar of the present invention will depend, of course, upon the properties desired in the mortar. In general, about 1 to 30 wt. percent emulsion polymer, preferably 3 to 15 wt. percent, most preferably about 10 wt. percent, based upon the total weight of the mortar will be employed. A particularly preferred mortar of the present invention will also contain about 0.01 to 0.25 wt. percent, e.g. 0.05 to 0.1 wt. percent methyl cellulose.

The invention can be further understood by the following examples which are illustrative only and are not intended to limit the invention in any respect.

*Example 1*

A mortar of the present invention was prepared by mixing 9 wt. percent of an isobutylene-diethyl fumarate-dibutyl fumarate emulsion with 64.3 wt. percent sand, 21.4 wt. percent Portland cement and 5.3 wt. percent water. The polymer was prepared as described in copending application, S.N. 379,731 and had a solids content of 30% and a pH of 8.5. The resulting mortar was workable and had a pot life of about two hours. Structural elements made from a bituminous binder and aggregate were joined together using the mortar in this example. The bond strength as determined by the modified ASTM C-321-57 was tested after three weeks of curing in air. The results showed a dry bond strength of 100 p.s.i. and a wet (determined after 24 hours submersion in water) bond strength of 56 p.s.i. The mortar had a dry compressive strength of 1150 p.s.i. as determined by ASTM C-306-60.

*Example 2*

A mortar of the present invention was prepared by mixing 10 wt. percent of a polymeric emulsion with 61.5 wt. percent sand, 20.8 wt. percent Portland cement, 7.7 wt. percent water and 0.1 wt. percent antifoam agent (dimethylpolysiloxane emulsion—10% solids). The polymeric emulsion was prepared as described in copending application, S.N. 379,371. The polymeric emultion consisted of 50 mole percent isobutylene, 35 mole percent dibutyl fumarate and 15 mole percent diethyl fumarate. The emulsion had a solids content of 40.6% and a pH of 8.5. The structural elements made from an asphalt and aggregate were joined together using this mortar. The bond strength was tested after curing for about three weeks. The results obtained from the tests showed a dry bond strength of 60 p.s.i. and a wet bond strength of 30 p.s.i., a dry compressive strength of 2100 p.s.i. and a wet compressive strength of 1160 p.s.i.

*Example 3*

A mortar of the present invention was prepared by mixing 9.9 wt. percent of the polymeric emulsion described in Example 2 with 60.6 wt. percent sand, 20.5 wt. percent Portland cement, 8.9 wt. percent water, 0.1 wt. percent antifoam agent and 0.05 wt. percent methyl cellulose. Structural elements made from asphalt and aggregate were joined together using this mortar. After three weeks curing bond strengths were determined. This mortar had a dry bond strength of 140 p.s.i. and a wet bond strength of 70 p.s.i.

As is known to those skilled in the art, conventional cementitious mortars do not bind structural elements made of bituminous binder and aggregate at all.

While the present invention has been described in detail with reference to specific examples, it is not intended that its scope should be limited thereto. Mortars described by this invention are not limited to bituminous materials; they can also be used to bond conventional masonry, such as clay bricks, cinder and concrete blocks, etc.

What is claimed is:

1. A cementitious mortar composition comprising cement, water, sand and an emulsion polymer of a $C_4$ to $C_9$ 2-methyl alpha olefin and a mixed dialkyl fumarate selected from the group consisting of dialkyl fumarate esters having the general formula:

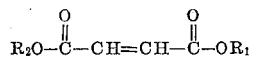

wherein $R_1$ is a $C_1$ to $C_3$ alkyl radical and $R_2$ is a $C_4$ to $C_{18}$ alkyl radical.

2. A composition as defined by claim 1 wherein said 2-methyl alpha olefin is isobutylene.

3. A composition as defined by claim 1 wherein said mixed dialkyl fumarate consists of diethyl fumarate and dibutyl fumarate.

4. A composition as defined by claim 1 which also contains 0.01 to 0.25 wt. percent methyl cellulose.

5. A composition as defined by claim 1 wherein said mixed dialkyl fumarate is a mixture of about 1 to 99 mole percent $C_1$ to $C_3$ dialkyl fumarate and about 99 to 1 mole percent $C_4$ to $C_{18}$ dialkyl fumarate.

6. A composition as defined by claim 1 in combination with a bituminous containing structural element.

No references cited.

WILLIAM H. SHORT, *Primary Examiner.*

J. NORRIS, *Assistant Examiner.*